United States Patent [19]

Melone

[11] 4,451,069
[45] May 29, 1984

[54] QUICK CONNECT FLUID COUPLING

[75] Inventor: Robert R. Melone, Rockford, Ill.

[73] Assignee: Smith Investment Company, Belvidere, Ill.

[21] Appl. No.: 406,721

[22] Filed: Aug. 9, 1982

[51] Int. Cl.³ .................... F16J 15/00; F16L 37/18
[52] U.S. Cl. .................... 285/86; 285/315; 285/DIG. 22
[58] Field of Search .............. 285/86, 315, 319, 423, 285/DIG. 22

[56] References Cited

U.S. PATENT DOCUMENTS

| | | | |
|---|---|---|---|
| 2,727,759 | 12/1955 | Elliott | 285/316 X |
| 2,754,135 | 7/1956 | Kramer | 285/315 X |
| 2,784,987 | 3/1957 | Corcoran | 285/315 X |
| 4,026,581 | 5/1977 | Pasbrig | 285/319 X |
| 4,275,907 | 6/1981 | Hunt | 285/319 X |
| 4,332,402 | 6/1982 | Shellhouse | 285/86 |

FOREIGN PATENT DOCUMENTS 2291438  6/1976  France .................... 285/319

*Primary Examiner*—Richard J. Scanlan, Jr.
*Attorney, Agent, or Firm*—Vernon J. Pillote

[57] ABSTRACT

A quick connect fluid coupling having a male member and a female member with radially resilient latch fingers for engaging the male coupling member. A locking sleeve having a continuous ring portion and a plurality of circumferentially spaced radially resilient fingers is movable from a position in which the ring portion surrounds the fingers on the female member to radially confine the same, and a release position in which the ring portion is spaced axially from the free ends of the fingers on the female member. Latch means are provided for releasably latching the locking sleeve in its locking position and in its release position.

7 Claims, 9 Drawing Figures

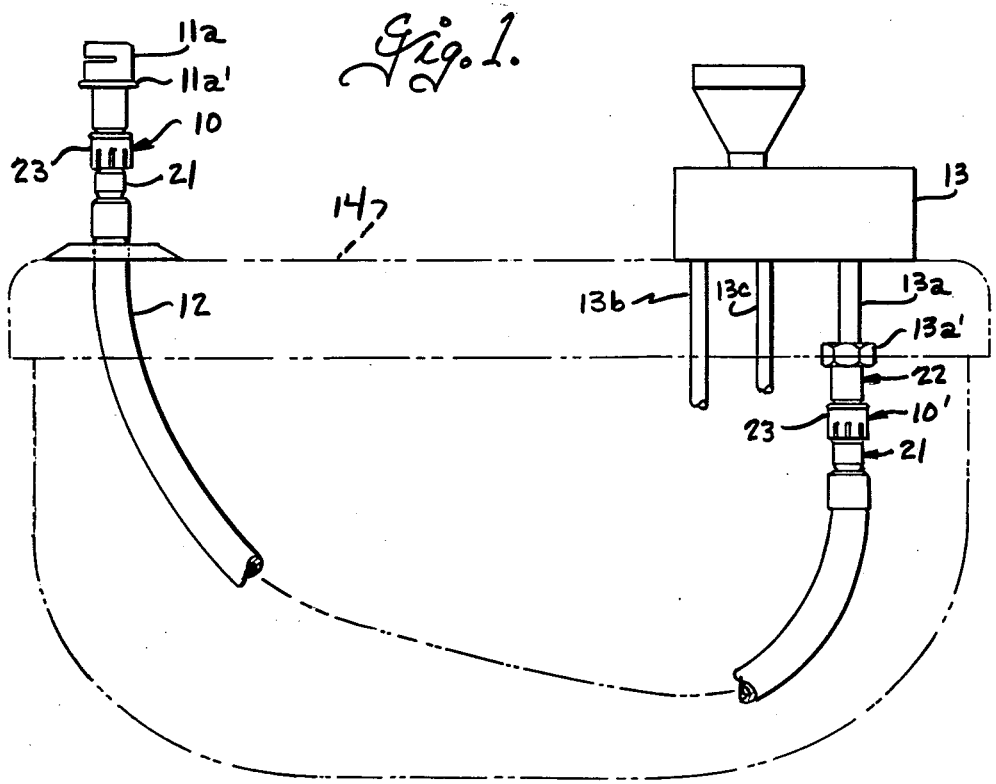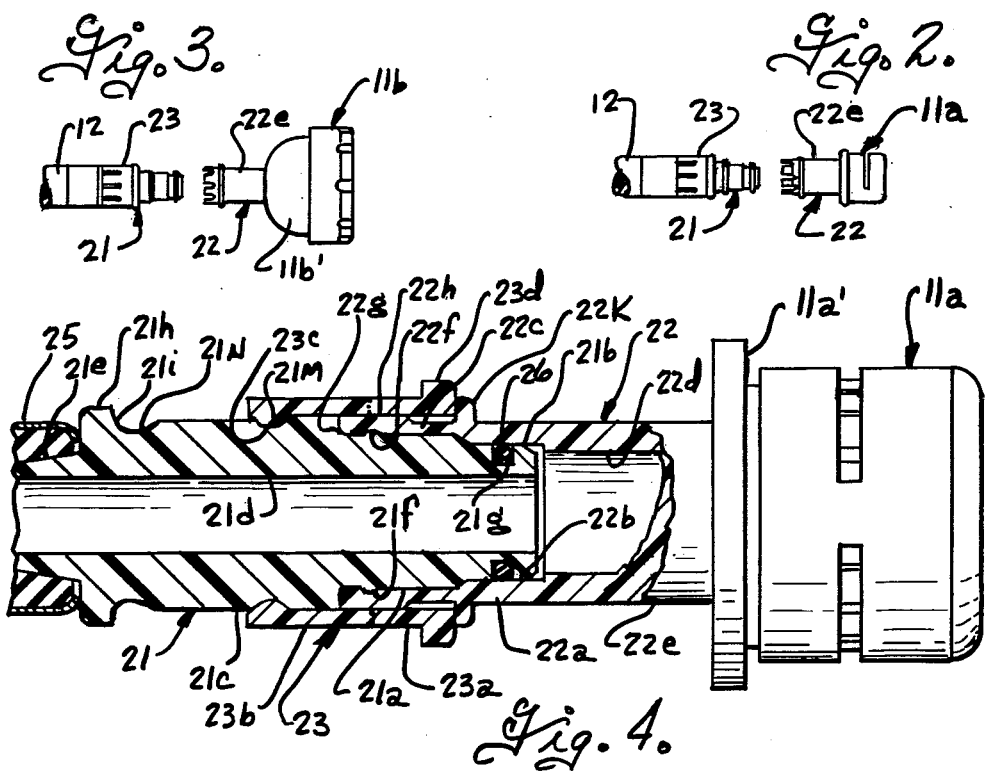

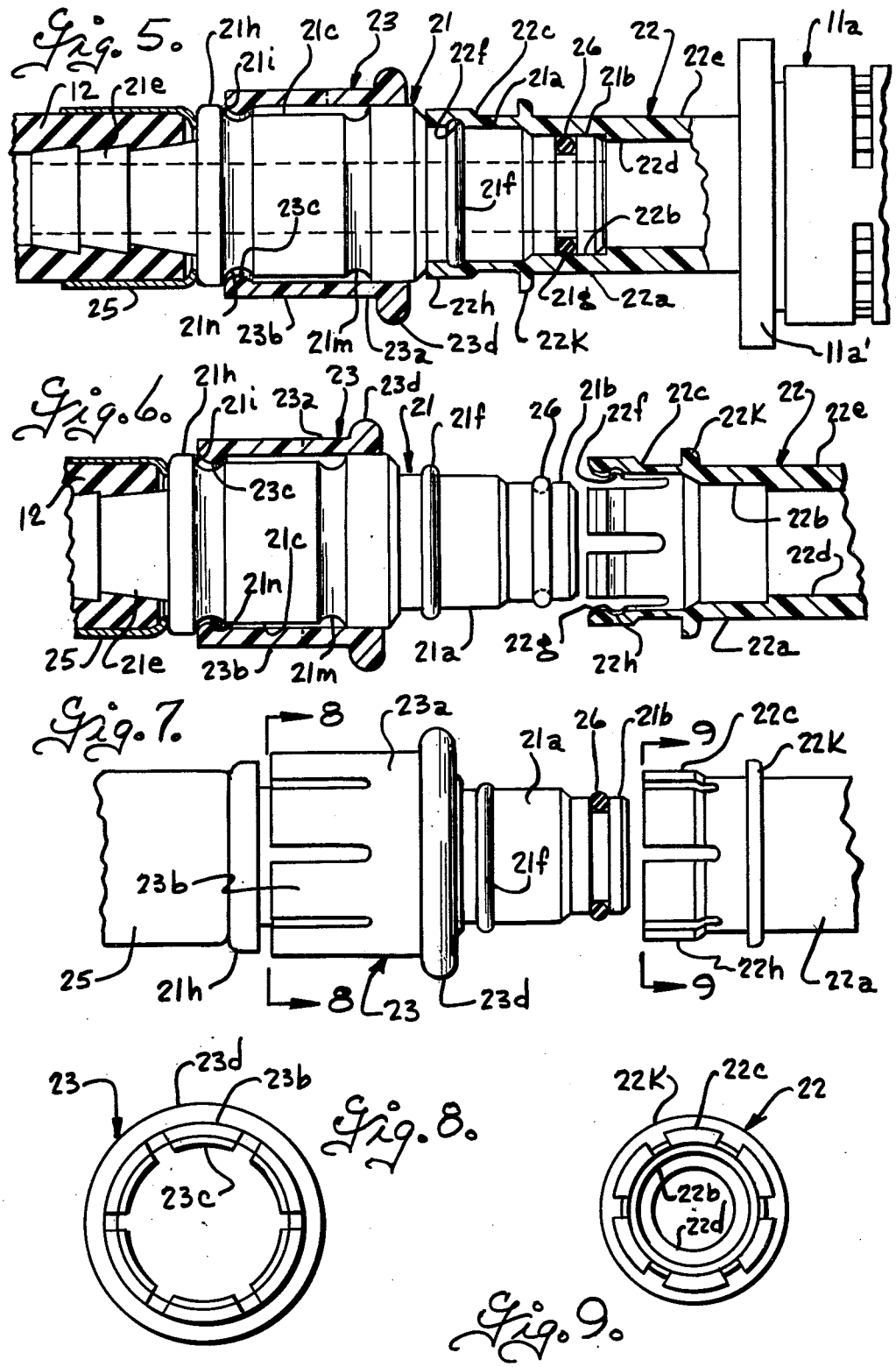

QUICK CONNECT FLUID COUPLING

BACKGROUND OF THE INVENTION

Fluid couplings such as shown in U.S. Pat. Nos. 2,727,759; 2,784,987; 4,026,581 and 4,275,907 have heretofore been proposed in which a male coupling member is axially insertable into a female coupling member, and the female coupling member has a plurality of resilient latch fingers extending in cantilever fashion from one end and provided with shoulders on their free ends arranged to engage shoulders on the male coupling member to latch the male coupling member to the female coupling member. A locking sleeve is provided and movable between a lock position surrounding the resilient fingers on the female member to hold them in their latched position, and a release position spaced from the ends of the resilient fingers on the female coupling member, to allow the fingers to move to a release position. In the couplings disclosed in U.S. Pat. Nos. 2,727,759 and 4,026,581, the locking sleeve is yieldably biased to its latched position by a spring. The use of a spring to bias the sleeve to its latch position increases the number of parts and cost of manufacturing and assemblying the coupling. In addition, it requires considerable dexterity to effect connection of the coupling members since it is necessary to retract the locking sleeve and hold the locking sleeve in a retracted position relative to one coupling member, during insertion of the male coupling member into the female coupling member. The quick connect coupling shown in Patent 2,784,987 does not use a spring to hold the sleeve in its lock position, but provides a releasable latch means between the sleeve and the free ends of the resilient fingers on the female member, for releasably retaining the locking sleeve in a lock position. However, this patent does not provide any means for holding the locking sleeve in a retracted or release position and, during assembly of the male and female coupling members, it is necessary to avoid applying any force on the locking sleeve which could extend the sleeve relative to the female coupling member, before the male coupling member is inserted into the female coupling member. U.S. Pat. No. 4,275,907 also avoids the use of a spring to move the locking sleeve to its locked position. However, the sleeve is only frictionally retained in its locking position and no provision is made for releasably retaining the sleeve in its retracted position.

SUMMARY OF THE INVENTION

It is an object of this invention to overcome the disadvantages of the prior art by providing a quick disconnect coupling which can be economically fabricated and which does not require a high degree of dexterity to effect connection and disconnection of the coupling.

A more particular object of this invention is to provide a quick disconnect fluid coupling of the type including a male coupling member and a female coupling member having resilient latch fingers for engaging the male coupling member, and which has an improved locking sleeve arrangement having provision for releasably retaining the locking sleeve in both its lock positions and its release positions.

Accordingly, the present invention provides a quick connect fluid coupling for detachably connecting two parts on a common axis which comprises a male member adapted to form the termination of a first part and a female member adapted to form the termination of a second part, the female member having an intermediate portion defining an annular internal seal wall and a plurality of circumferentially spaced radially resilient fingers extending in cantilever fashion from the intermediate portion to the distal end of the female member, the male member having an annular intermediate portion dimensioned to be received inside the resilient fingers on the female member and an annular nose portion at the free end of the male member dimensioned for reception in the internal seal wall on the female member, annular seal means between the annular nose portion and the annular seal wall for sealing the interface therebetween, a first shoulder means on the outer side of the intermediate portion of the male member and a second shoulder means on the inner side of the fingers on the female member adjacent the free end thereof for engagement with the first shoulder means on the male member when the nose portion on the male member is positioned in the internal seal wall on the female member. The coupling is characterized by the provision of a locking sleeve having a circumferentially continuous ring portion and a plurality of circumferentially spaced radially resilient fingers extending in cantilever fashion from the ring portion, the ring portion of the locking sleeve being dimensioned to surround the fingers on the female member when the locking sleeve is in a first locking position and radially confine the fingers at a position in which the second shoulder means is in locking engagement with the first shoulder means to lock the male member against axial withdrawal from the female member, the locking sleeve being slidably mounted on one of said members for movement from said first locking position to a second release position in which the ring portion is spaced axially from the free ends of the fingers on the female member, the fingers on the sleeve having third shoulder means on the inner side thereof adjacent their free ends, said one of said members having fourth shoulder means at a location thereon to engage the third shoulder on the locking sleeve when the sleeve is in said first locking position thereof, said one of said members having a fifth shoulder means thereon at a location to engage said third shoulder means on the locking sleeve when the sleeve is in its said second release position thereof, said resilient fingers on the locking sleeve resiliently biasing the third shoulder means thereon radially inwardly into engagement with said fourth and fifth shoulder means when the locking sleeve is in said first locking position and said second release position respectively, the third shoulder means and the fourth shoulder means having cam surfaces shaped to cam the fingers in the sleeve outwardly when axial force is applied to the sleeve in a direction to move the sleeve from the first locking position to the second release position and the third shoulder means and the fifth shoulder means having cam surfaces shaped to cam the fingers on the sleeve outwardly when axial force is applied to the sleeve in a direction to move the sleeve from the second release position to the first locking position.

These, together with other objects and features and advantages of this invention will be more readily understood by reference to the following detailed description, when taken in connection with the accompanying drawings wherein:

FIG. 1 is a partially diagrammatic view illustrating the invention applied to a shampoo spray apparatus on a shampoo bowl;

FIGS. 2 and 3 are fragmentary side elevational views illustrating use of the coupling for connection of different forms of spray heads to a hose;

FIG. 4 is a longitudinal sectional view through the coupling apparatus and illustrating the parts on a larger scale than in FIGS. 1–3;

FIG. 5 is a longitudinal view of the coupling with parts shown in section and other parts in elevation, and with the locking sleeve in its retracted position;

FIG. 6 is a view illustrating the male and female members of the coupling disconnected, and with parts of the members shown in section and other parts in elevation;

FIG. 7 is an elevational view of the coupling showing male and female members disconnected;

FIG. 8 is an end elevational view of the locking sleeve taken on the plane 8—8 of FIG. 7; and FIG. 9 is an end elevational view of the female coupling member taken on the plane 9—9 of FIG. 7.

The quick connect fluid coupling of the present invention is generally adapted for connecting two parts of a fluid flow system. In the embodiment illustrated, a quick connect fluid coupling 10 is utilized to detachably connect different shampoo spray heads such as shown at 11a and 11b to the end of a flexible hose 12 in a shampoo bowl 14. Another quick disconnect coupling 10' is advantageously utilized to detachably connect the other end of the hose 12 to the outlet 13a of a combination mixing and shut-off valve 13, having hot and cold water inlets 13b and 13c. As described more fully hereinafter, the quick connect fluid coupling is not only arranged to enable quick connection and disconnection of the two parts, but also arranged to allow relative turning between the two parts as is advantageous in some applications such as in the shampoo spray apparatus.

In general, the coupling 10 includes a male coupling member 21, a female coupling member 22, and a locking sleeve 23. The male coupling member 21 is advantageously molded in one piece of a resilient synthetic resin material, for example an acetal resin, and includes an intermediate portion 21a, a nose portion 21b at one end of the intermediate portion, and a sleeve mounting portion 21c at the other end of the intermediate portion. The male member has a flow passage 21d extending axially therethrough and a means 21e at the end opposite the nose portion for connecting the male member to one of the parts of the fluid flow apparatus. In the embodiment illustrated, the male coupling member is adapted for connection to a flexible hose such as the hose 12, and the portion 21e is in the form of a tube adapted to extend into the end of the hose which is clamped thereto by a ferrule 25. The male coupling member has a circular cross section throughout and the nose portion 21b has generally cylindrical outer configuration with a diameter smaller than the outer diameter of the intermediate portion 21a, and the sleeve mounting portion 21b has a generally cylindrical outer configuration with an outer diameter larger than the outer diameter of the intermediate portion 21a.

The female member 22 is also advantageously molded in one piece of a synthetic resin material, which may conveniently be the same as that used for the male coupling member, and the female member includes an intermediate portion 22a having an inner seal wall 22b of generally cylindrical configuration and dimensioned to slidably receive the nose portion 21b of the male member. The female member 22 also includes a plurality of circumferentially spaced radially resilient fingers 22c extending in cantilever fashion from the intermediate portion 22a to the distal end of the female member. As will be seen from FIG. 9, the fingers 22c on the female member have a transversely arcuate configuration and form generally cylindrical segments that surround the intermediate portion 21a of the male member. The female member 22 has a flow passage 22d extending therethrough and the end portion 22e of the female member is adapted for connection to another part of the fluid flow apparatus. In the form shown in FIGS. 1, 2, 4 and 5, the end portion 22e of the female member is attached to or formed integrally with a base portion 11a' to receive a spray head 11a. In the embodiment shown in FIG. 3, the portion 22e of the female member is formed integrally with a base portion 11b' of a spray head 11b designed to produce a different spray pattern from the spray head 11a. The end portion 22e can also be adapted for connection, as by a fitting or coupling 13a' to a flow conduit such as the outlet pipe of a mixing valve 13, as shown in FIG. 1. Alternatively, the end portion 22e of the female coupling member could also be adapted for connection to the end of another hose section, for example by the provision of a tubular portion similar to that shown at 21e on the male member.

A means is provided for sealing the interface between the male and female coupling members when they are interconnected. The seal means preferably comprises an annular resilient ring such as an O-ring 26 disposed in a groove or recess 21g in the nose portion 21b of the male member, and arranged to slidably engage the seal wall 22b on the female member. Interengaging locking or shoulder means are provided on the fingers 22c of the female member 22 and on the intermediate portion 21a of the male member, to releasably connect the male and female members. The interengaging shoulder means is preferably in the form of an annular rib 21f formed on the outer periphery of the intermediate portion 21a of the male member, and grooves 22f formed on the inner surface of the fingers 22c of the female member, adjacent the free ends of the fingers. The grooves 22f on the fingers are aligned in a plane transverse to the axis of the female member to form an annular groove means adapted to receive the rib 21f on the male member. The female member is formed of a resilient plastic material and the fingers 22c are formed with an intermediate portion of reduced radial thickness to allow limited radial movement of the free ends of the fingers. The fingers are formed such that, when undistended, the internal opening defined by the fingers is slightly larger than the outer diameter of the intermediate portion 21a and smaller than the outer diameter of the rib 21f. Thus, the fingers are normally biased radially inwardly to a position to receive the rib 21f. The lead end of the fingers is beveled as indicated at 22g to cam the fingers 22c outwardly as a male member is inserted into the female member, and the fingers then move inwardly to a position receiving the rib 21f when the nose portion of the male member is positioned in the sealing wall of the female member. The rib 21f and the grooves 22f have their engaging surfaces shaped to cam the fingers on the female member outwardly, when axial forces are applied to the male and female members in a direction to pull the male member out of the female member. As shown, the rib 21f has a generally semi-circular cross section as viewed radially of the male member, and the grooves 22f similarly have a generally semi-circular cross section as viewed radially of the female member, so that the surfaces on the fingers and ribs that engage during withdrawal of the male member from the female member, define an included angle of less than 90° to the axis of the respective member.

The locking sleeve 23 has a circumferentially continuous portion 23a and a plurality of circumferentially spaced radially resilient fingers 23b. As best shown in FIG. 8, the fingers 23b have an arcuate cross section and are arranged in the form of a cylinder having an inner diameter dimensioned to slidably surround the end portion 21c of the male coupling member. The fingers 22c of the female coupling member have an outer surface 22h adjacent their free ends and the inner diameter of the ring portion 23a of the sleeve is dimensioned to closely surround the surfaces 22h on the fingers of the female member, when the locking sleeve is in a locking position as shown in FIG. 4. The ring portion 23a of the sleeve radially confines the fingers at a position in which the rib 21f on the male member extends into the recesses 22f on the fingers of the female member, to thereby lock the male member against axial withdrawal from the female member.

The locking sleeve is slidable from its locking position shown in FIG. 4 to a release position as shown in FIG. 5 in which the sleeve is spaced axially from the fingers on the female member. Provision is made for releasably securing the sleeve in its locking position shown in FIG. 4, and in its release position shown in FIGS. 5–7. For this purpose, ribs 23c are provided on the inner surface of the fingers 23b on the sleeve adjacent their free ends and first and second grooves 21m and 21n are provided on the end portion 21c of the male member at axially spaced locations therealong, to receive the ribs 23c when the sleeve is in its locking position and in its release positions respectively. The sleeve 23 is formed of a resilient synthetic resin material, which may conveniently be the same as that previously described for the other parts of the coupling, and the fingers on the sleeve are formed so that they are normally biased to a position as shown in FIG. 4 in which the ribs 23c on the fingers extend into one or the other of the grooves 21m, 21n on the male coupling member, to releasably lock the sleeve in either its lock or release positions. The ribs 23c preferably extend through the arcuate width of the fingers 23b to form a generally annular rib means, and the interengaging faces of the ribs 23c and grooves 21m, 21n have surfaces shaped to cam the ribs out of the grooves when an axial force is applied to the sleeve to move it from one position to the other. Preferably, the ribs 23c have an arcuate cross section, as viewed in a radial plane through the axis of the sleeve, and the grooves 21m and 21n also preferably have an arcuate cross section as viewed in a plane radially of the male coupling member. Thus, the interengaging faces of the ribs and sleeve are disposed at an included angle of less than 90° to the respective member and function to cam the free ends of the fingers 23b outwardly when the sleeve member is moved to the left from the lock position shown in FIG. 4 toward its release position, and also operate to cam the free ends of the fingers outwardly when the sleeve is moved in the other direction relative to the male coupling member from its release position shown in FIG. 5 toward its lock position. An annular collar 23d is conveniently provided on the outer periphery of the ring portion 23a of the sleeve, to facilitate application of an axial force on the sleeve for moving the same from one position to the other. An annular collar 22k is also provided on the female member, at a location to engage and stop the sleeve in its lock position. A shoulder 21i is provided on an annular collar 21h of the male coupling member 21, to act as a positive stop for the sleeve 23 while disconnecting the coupling.

From the foregoing it is thought that the construction and operation of the coupling member will be readily understood. In order to connect the male and female coupling members, the locking sleeve is moved to its retracted position shown in FIG. 5 and the male member is then inserted into the female member until the fingers 22c on the female member snap over the rib 21f on the intermediate portion of the male member. The O-ring seal 26 seals the interface between the male and female coupling members. The sleeve 23 is then moved axially to the right as viewed in the drawings to a position in which the ring portion 23a surrounds the free ends of the fingers on the female coupling member and the ribs 23c extend into the groove 22m on the male coupling member. When the ribs 23c extend into the groove 22m, they releasably hold the sleeve in its lock position and the ring portion of the sleeve radially confines the fingers on the female coupling member so that they cannot move outwardly and disengage from the rib 21f on the male coupling member. Disconnection of the coupling is effected by retracting the sleeve to the left relative to the male coupling member until the ribs 23c extend into the groove 22n on the male coupling member and the ring portion is spaced axially from the free ends of the fingers on the female coupling member. The male coupling member can then be axially withdrawn from the female coupling member.

When the locking sleeve is retracted to its release position for disconnection of the coupling, it is releasably retained in its release position shown in FIGS. 5–7. It is accordingly not necessary, when recoupling the male and female members, to have a separate manipulation to again retract the locking sleeve relative to the male coupling member. Although the fingers on the locking sleeve are radially resilient and arranged to cam outwardly when an axial force is applied for moving the locking sleeve relative to the male coupling member, the locking of the sleeve in its release position on the male coupling member can be markedly increased by radially compressing the fingers on the locking sleeve, to thereby inhibit sliding of the locking sleeve relative to the male coupling member from its release to its lock position. Thus, during connection of the male and female members, the locking sleeve on the male coupling member can be grasped by the user between the fingers of one hand and radially compressed to hold the locking sleeve in its release position on the male member and to also exert an axial force on the male member sufficient to insert it into the female member and engage the fingers on the female member. The radial compression on the fingers of the locking sleeve can then be released somewhat, while continuing to press the locking sleeve in a direction toward the female coupling member, to thereby cause sliding of the locking sleeve from its release position to its locking position around the fingers on the female coupling member. Thus, insertion of the male coupling member into the female coupling member and movement of the locking sleeve into position on the female coupling member can be effected in a smooth, generally continuous motion. To disconnect the male and female coupling member, the locking sleeve is grasped at annular collar 23d by the fingers in one hand and the body portion 22e of the female member is grasped by the fingers in the other hand and, when the hands are moved in relatively opposite directions, the sleeve is first moved to its retracted position relative to the male coupling member and the male coupling member thereafter withdrawn from the female coupling member. Thus, disconnection of the coupling can also be effected in a smooth generally continuous motion.

The embodiments of the invention in which an exclusive property or privilege is claimed are defined as follows:

1. A quick connect fluid coupling for detachably connecting two parts on a common axis comprising, a male member adapted to form the termination of a first part and a female member adapted to form the termination of a second part, the female member having an intermediate portion defining an annular internal seal wall and a plurality of circumferentially spaced radially resilient fingers extending in cantilever fashion from the intermediate portion to the distal end of the female member, the male member having an annular intermediate portion dimensioned to be received inside the resilient fingers on the female member and an annular nose portion at the free end of the male member dimensioned for reception in the internal seal wall on the female member, annular seal means between the annular nose portion and the annular seal wall for sealing the interface therebetween, a first shoulder means on the outer side of the intermediate portion of the male member and a second shoulder means on the inner side of the fingers on the female member adjacent the free end thereof for engagement with the first shoulder means on the male member when the nose portion on the male member is positioned in the internal seal wall on the female member, a locking sleeve having a circumferentially continuous ring portion and a plurality of circumferentially spaced radially resilient fingers extending in cantilever fashion from the ring portion, the ring portion of the locking sleeve being dimensioned to surround the fingers on the female member when the locking sleeve is in a first locking position and radially confine the fingers at a position in which the second shoulder means is in locking engagement with the first shoulder means to lock the male member against axial withdrawal from the female member, the locking sleeve being slidably mounted on one of said members for movement from said first locking position to a second release position in which the ring portion is spaced axially from the free ends of the fingers on the female member, the fingers on the sleeve having third shoulder means on the inner side thereof adjacent their free ends, said one of said members having fourth shoulder means at a location thereon to engage the third shoulder means on the locking sleeve when the sleeve is in said first locking position thereof, said one of said members having a fifth shoulder means thereon at a location to engage said third shoulder means on the locking sleeve when the sleeve is in its said second release position thereof, said resilient fingers on the locking sleeve resiliently biasing the third shoulder means thereon radially inwardly into engagement with said fourth and fifth shoulder means when the locking sleeve is in said first locking position and said second release position respectively, the third shoulder means and the fourth shoulder means having cam surfaces shaped to cam the fingers in the sleeve outwardly when axial force is applied to the sleeve in a direction to move the sleeve from the first locking position to the second release position and the third shoulder means and the fifth shoulder means having cam surfaces shaped to cam the fingers on the sleeve outwardly when axial force is applied to the sleeve in a direction to move the sleeve from the second release position to the first locking position.

2. A quick connect fluid coupling according to claim 1 wherein said locking sleeve is slidably mounted on said male member and said fourth and fifth shoulder means are provided on the outer periphery of the male member at axially spaced locations therealong.

3. A quick connect fluid coupling according to claim 1 wherein said first shoulder means comprises an annular rib on the outer periphery of the intermediate portion of the male member and said second shoulder means comprises groove means in the inner side of the fingers on the female member.

4. A quick connect fluid coupling according to claim 1 or 3 wherein the locking sleeve is slidably mounted on the male member, said fourth and fifth shoulder means comprising annular grooves in the outer periphery of the male member and said third shoulder means comprises inwardly extending ribs on the inner surface of the fingers on the locking sleeve.

5. A quick connect coupling according to claim 1 in which one of the parts is a flexible hose and the other of the parts is a fluid spray head.

6. A quick connect fluid coupling for detachably connecting two parts on a common axis comprising, a male member adapted to form the termination of a first part and a female member adapted to form the termination of a second part, the female member having an intermediate portion defining an annular internal seal wall and a plurality of circumferentially spaced radially resilient fingers extending axially in cantilever fashion from the intermediate portion to the free end of the female member, the male member having an annular intermediate portion dimensioned to be received inside the resilient fingers on the female member and an annular nose portion at the free end of the male member dimensioned for reception in the internal seal wall on the female member, annular seal means between the annular nose portion and the annular seal wall for sealing the interface therebetween, a first annular rib means on the outer side of the intermediate portion of the male member and a first groove means on the inner side of the fingers on the female member adjacent the free ends thereof, the resilient fingers on the female member being normally biased inwardly to a position in which the first groove means in the fingers receive the first annular rib means on the male coupling member when the nose portion on the male member is positioned in the internal seal wall of the female member, the first rib means and the first groove means having surfaces shaped to cam the fingers on the female member outwardly when axial forces are applied to the male and female members to either insert the male member into the female member or to pull the male member out of the female member, a locking sleeve having a circumferentially continuous ring portion and a plurality of circumferentially spaced radially resilient fingers extending in cantilever fashion from the ring portion, the ring portion being dimensioned to surround the fingers on the female member when the locking sleeve is in a first locking position and radially confine the fingers at a position in which the first groove means receives the first rib means to lock the male member against axial withdrawal from the female member, the locking sleeve being slidably mounted on the male member from said first locking position to a second release position in which the ring portion is spaced axially from the free ends of the fingers on the female member, the fingers on the sleeve having second rib means on the inner side thereof adjacent their free ends, said male member having second annular groove means in the outer periphery thereof at a location to receive the second rib means on the fingers of the locking sleeve when the sleeve is in said first locking position thereof, the male member having a third annular groove means in the outer periphery thereof at a location to receive the second rib means on the fingers of the locking sleeve when the sleeve is in said second release position thereof, said resilient fingers on the locking sleeve normally biasing the second rib means thereon radially inwardly to extend into the second and third annular groove means when the locking sleeve is in said first locking position and said second release position respectively, the second rib means and the second groove means having surface shaped to cam the second rib means out of the second groove means when axial force is applied to the sleeve in a direction to move the sleeve from the first locking position to the second release position and the second rib means and the third groove means having surfaces shaped to cam the second rib means out of the third groove means when axial force is applied to the sleeve in a direction to move the sleeve from the second release position to the first locking position.

7. A quick connect fluid coupling according to claim 6 including shoulder means on said male member engageable with said locking sleeve when it is moved to said second release position to act as a positive stop for the locking sleeve when disconnecting the coupling.

* * * * *